United States Patent
Tang et al.

(10) Patent No.: US 9,574,033 B1
(45) Date of Patent: *Feb. 21, 2017

(54) PROCESS FOR CONTINUOUSLY MAKING HIGH MOLECULAR WEIGHT TETRAPOLYMER FOR USE IN ANTI-VIBRATION APPLICATIONS

(71) Applicant: LION COPOLYMER GEISMAR, LLC, Geismar, LA (US)

(72) Inventors: Solomon H. K. Tang, Geismar, LA (US); Willie Charles Burton, Geismar, LA (US); Garrett Doucet, Geismar, LA (US)

(73) Assignee: LION COPOLYMER GEISMAR, LLC, Geismar, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/235,971

(22) Filed: Aug. 12, 2016

(51) Int. Cl.
| | |
|---|---|
| C08F 210/18 | (2006.01) |
| C08K 5/14 | (2006.01) |
| C08F 236/20 | (2006.01) |
| C08F 2/14 | (2006.01) |
| C08F 2/34 | (2006.01) |
| C08L 23/16 | (2006.01) |
| C08L 23/14 | (2006.01) |
| C08K 5/134 | (2006.01) |

(52) U.S. Cl.
CPC ............ *C08F 210/18* (2013.01); *C08F 2/14* (2013.01); *C08F 2/34* (2013.01); *C08F 236/20* (2013.01); *C08K 5/1345* (2013.01); *C08L 23/14* (2013.01); *C08L 23/16* (2013.01)

(58) Field of Classification Search
CPC ......... C08F 210/18; C08F 236/20; C08F 2/14; C08F 2/34; C08K 5/1435; C08L 23/16; C08L 23/14
USPC ........ 524/291; 526/88, 143, 169.2, 282, 905
See application file for complete search history.

(56) References Cited

U.S. PATENT DOCUMENTS

| | | | |
|---|---|---|---|
| 3,838,137 A | 9/1974 | Tang | |
| 3,856,765 A | 12/1974 | Collette et al. | |
| 3,884,993 A * | 5/1975 | Gros | C08J 3/005 525/192 |
| 3,903,062 A | 9/1975 | Arrighetti et al. | |
| 4,156,767 A | 5/1979 | Hall | |
| 5,242,971 A * | 9/1993 | Nakahama | C08L 21/00 524/482 |
| 5,473,017 A | 12/1995 | Wang | |
| 5,621,044 A | 4/1997 | Wang | |
| 5,786,504 A | 7/1998 | Nudenberg et al. | |
| 6,300,451 B1 | 10/2001 | Mehta et al. | |
| 6,384,162 B1 | 5/2002 | Zahalka et al. | |
| 6,686,419 B2 * | 2/2004 | Wouters | C08F 210/18 524/554 |
| 8,901,236 B2 * | 12/2014 | Burton | C08F 236/20 524/554 |
| 8,901,238 B2 * | 12/2014 | Tang | C08F 210/06 524/557 |
| 9,139,726 B2 | 9/2015 | Tang et al. | |
| 2004/0122190 A1 | 6/2004 | Cady et al. | |
| 2014/0100325 A1 | 4/2014 | Burton et al. | |

FOREIGN PATENT DOCUMENTS

CA            980497 A1    12/1975

OTHER PUBLICATIONS

Skinner et al, Cis-trans isomerism in Ziegler-catalysed terpolymerization of hexa-1,4-diene with ethylene and propylene, Polymer, vol. 13, Issue 5, May 1972, pp. 242-244.

* cited by examiner

*Primary Examiner* — Michael M Bernshteyn
(74) *Attorney, Agent, or Firm* — Buskop Law Group, PC; Wendy Buskop

(57) ABSTRACT

A process and articles for continuously making a tetrapolymer using two reactors connected in series with two unsaturated hydrocarbon streams, two injections of ethylene monomer, two injections of propylene monomer, and two injections of two different non-conjugated diene monomers with a Ziegler-Natta, a catalyst, a co-catalyst, and an optional promoter. The process allows for the creation of products and articles with high molecular weights while utilizing continuous flow reactors in series. The process allows for manufacture of anti-vibration articles made by tetrapolymers.

16 Claims, No Drawings

PROCESS FOR CONTINUOUSLY MAKING HIGH MOLECULAR WEIGHT TETRAPOLYMER FOR USE IN ANTI-VIBRATION APPLICATIONS

FIELD

The present embodiments generally relate to a process for forming a low damping high strength ethylene propylene diene polymer.

BACKGROUND

A need exists for a process to create a low damping high strength polymer with both high density impact absorbance and high heat resistance.

A need exists for a process to create a low damping high strength polymer for use as motor mounts.

A need exists for a process to create a low damping high strength polymer with a significant degree of long chain branching, a high degree of diene content, a unique molecular structure, and favorable elasticity characteristics.

The present embodiments meet these needs.

DETAILED DESCRIPTION OF THE EMBODIMENTS

Before explaining the present process in detail, it is to be understood that the process is not limited to the particular embodiments and that it can be practiced or carried out in various ways.

The present embodiments generally relate to a process for forming a low damping high strength ethylene propylene diene polymer.

The embodiments further relate to a continuous process for making an ethylene propylene diene polymer utilizing ethylene, propylene, and diene monomers in two reactors.

The process enables a person ordinarily skilled in the art to create an ethylene propylene diene polymer containing high diene content without reactor fouling due to gelling (or uncontrolled branching reactions).

The process further allows generating an ethylene propylene diene polymer with high degrees of long chain branching, a high molecular weight, a broad molecular weight distribution (MWD), a low tangent delta, and a high diene content while making use of a known catalyst and two reactors in series.

Use of two reactors in series eliminates the need for a blending process to combine two ethylene propylene diene polymers with different compositions and molecular weight distributions into a single polymer product enabling faster processing than other known processes. No post reactor blending is needed with the process.

The final tetrapolymer product contains ethylene propylene diene monomer (EPDM) polymer with high molecular weight having a very high state of cure with lower diene content than previously developed EPDM polymers. Stronger polymers provide improved mechanical properties, particularly for anti-vibration purposes.

The term "diene" as used herein can refer to an organic molecule containing two double bonds. Further, usable dienes can be those capable of being polymerized by a Ziegler-Natta catalyst. In embodiments, the Ziegler-Natta catalyst can be a vanadium oxytrichloride or a vanadium trialkoxide.

The term "high molecular weight" as used herein can refer to an EPDM polymer with molecular weights as described below:
Mn >350,000 Dalton
Mw >500,000 Dalton
wherein Mn is defined as number average molecular weight, Mw is defined as weight average molecular weight.

The term "molecular weight distribution" (MWD) or polydispersity as used herein can refer to the weight average molecular weight of a polymer (Mw) divided by the number average molecular weight of a polymer (Mn). Mw and Mn are calculated as follows:

$$M_n = \frac{\sum_i N_i M_i}{\sum_i N_i} \text{ and } M_w = \frac{\sum_i N_i M_i^2}{\sum_i N_i M_i}$$

The term "tangent delta" as used herein refers to a measure of the relationship between viscosity and elasticity of a polymer known to those ordinarily skilled in the art, which is, in general, inversely proportional to the degree of long chain branching.

The descriptions below make use of norbornene derivatives as the diene for exemplary reasons. In particular, vinyl norbornene can be usable herein. However, other dienes with similar chemical and reactive characteristics can be substituted by persons ordinarily skilled in the art.

In this process, a 5-Ethylidene-2-norbornene (ENB) can be used. In embodiments it can comprise the structure:

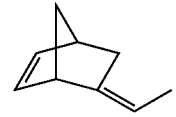

Molecular Structure:
Formula: C9H12
Molecular Weight: 120.19
Synonyms for this molecule can include: ENB; Ethylidene Norbornene; 5-Ethylene-2-Norborene; Ethylidene-2-Norbornene; 5-Ethylidene Norbornene; 5-Ethylidene-2-Norbornene; 5-Ethylidenenorborn-2-ene; 5-ethylidene-5-norbornene; Ethylidene Norbornene (ENB)
Boiling Point: 146 degrees Celsius at 760 mmHg
Flash Point: 38.3 degrees Celsius In this process, a 5-vinyl-2-norbornene (VNB) can be used which is known by the structure:

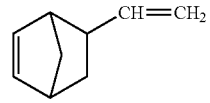

Molecular Structure:
Formula: C9H12
Molecular Weight: 120.21
Synonyms for this molecule can include: 2-Norbornene, 5-vinyl-(6CI,7CI,8CI); 2-Vinyl-5-norbornene; 2-Vinylbicyclo[2.2.1]hept-5-ene; 2-Vinylnorbornene; 5-Ethenylbicyclo[2.2.1]hept-2-ene; 5-Vinyl-2-norbornene; 5-Vinylbicyclo[2.2.1]hept-2-ene; 5-Vinylnorbornene; NSC 61529; V 0062; VBH; Vinylnorbornene Boiling Point: 141 degrees Celsius at 760 mmHg Flash Point: 28 degrees Celsius VNB is a non-conjugated diene with which it is known to be difficult to create copolymers due to its propensity to branch uncontrollably, create gels during polymerization, and foul a reactor.

The general process is described as follows:

In a first reactor, a saturated hydrocarbon stream can be introduced continuously.

In embodiments, a propylene monomer can be continuously introduced to the saturated hydrocarbon stream at a rate sufficient to achieve a propylene content of 20 percent to 35 percent based on total weight in a high molecular weight tetrapolymer product formed in the first reactor.

A hydrogen gas can be introduced to the saturated hydrocarbon stream at a rate sufficient to control the molecular weight of the high molecular weight tetrapolymer product formed in the first reactor.

In embodiments, a first non-conjugated diene can be flowed into the saturated hydrocarbon stream continuously at a rate sufficient to achieve a desired first non-conjugated diene content in the high molecular weight tetrapolymer product formed in the first reactor.

A second non-conjugated diene can be introduced continuously in the first reactor to the saturated hydrocarbon stream at a rate sufficient to achieve a desired second non-conjugated diene content in the high molecular weight tetrapolymer product with a molecular weight distribution of 1.0 to 2.2, wherein the first non-conjugated diene can be different from the second non-conjugated diene.

An ethylene monomer can be flowed into the first reactor to contact the saturated hydrocarbon stream at a rate sufficient to initiate the polymerization reaction and achieve desired ethylene content of 50 percent to 80 percent of total weight in the high molecular weight tetrapolymer product with a molecular weight distribution of 1.0 to 2.2.

In embodiments, the combined saturated hydrocarbon stream, the propylene monomer, the hydrogen gas, the first non-conjugated diene, the second non-conjugated diene, and the ethylene monomer can then be cooled to below 35 degrees Celsius to create a cooled mixture.

In embodiments, the Ziegler-Natta catalyst and a co-catalyst, and optionally, a promoter, can be flowed into the cooled mixture.

The Ziegler-Natta catalyst can be a transition metal compound.

The Ziegler-Natta catalyst can be introduced at a feed rate sufficient to sustain a continuous reaction.

In embodiments, the co-catalyst can be a metal alkyl comprising a halogen element.

The promoter, if used, can be an oxidizing agent capable of oxidizing the transition metal, and generating at least one halogen free-radical per mole of the promoter.

In embodiments, the cooled mixture can be reacted using the Ziegler-Natta catalyst, the co-catalyst, and if used, the promoter, for 15 minutes to 60 minutes at a temperature from 35 degrees Celsius to 65 degrees Celsius and at a pressure from 190 psig to 230 psig; forming an high molecular weight tetrapolymer product in the first reactor having 8 characteristics.

In embodiments, the characteristics of the tetrapolymer formed in the first reactor can be polymer chain branching as characterized by a tangent delta ranging from 0.15 to 0.75 measured at 150 degrees Celsius, 0.84 rad/sec and 13.95 percent strain amplitude on a rubber process analyzer RPA 2000™ made by Alpha Technologies.

Additionally, the characteristics can be a non-linear relationship between viscosity and shear as characterized by the tangent delta from 0.15 to 0.75 measured at 150 degrees Celsius, 0.84 rad/sec and 13.95 percent strain amplitude on a rubber process analyzer RPA 2000™ made by Alpha Technologies.

In embodiments, the characteristics of the tetrapolymer formed in the first reactor can include a weight average molecular weight from 1,500,000 to 2,500,000 Daltons measured using a high temperature GPC (HTGPC) system equipped with triple detector array (TDA) manufactured by Malvern Instruments, Inc. at 125 degrees Celsius.

The characteristics of the tetrapolymer formed in the first reactor can have a dynamic complex viscosity for 1,500,000 to 3,500,000 Pa sec. measured at 150 degrees Celsius, 0.1 rad/sec and 13.95 percent strain amplitude on a rubber process analyzer RPA 2000™ made by Alpha Technologies.

In embodiments, the characteristics of the tetrapolymer formed in the first reactor can have an ethylene to propylene ratio ranging from 50:50 to 90:10 by weight forming an ethylene rich high molecular weight tetrapolymer product.

The characteristics of the tetrapolymer formed in the first reactor can have a molecular weight distribution ranging from 1.0 to 2.2 needed for producing a higher mechanical strength in the final high molecular weight tetrapolymer product.

In embodiments, the characteristics of the tetrapolymer formed in the first reactor can include a first non-conjugated diene content of 0.2 percent to 2 percent by weight content based upon the total weight.

The characteristics of the tetrapolymer formed in the first reactor can have a second non-conjugated diene content of 0.2 percent to 15 percent by weight content based upon the total weight.

In a second reactor, the high molecular weight tetrapolymer from the first reactor can be continuously received.

In embodiments, a saturated hydrocarbon stream can be introduced to the second reactor.

A propylene monomer can be introduced to the saturated hydrocarbon stream in the second reactor at a rate sufficient to achieve a total propylene content of 29 percent to 45 percent of total weight in the final tetrapolymer product produced by the second reactor.

A first non-conjugated diene can be introduced to the saturated hydrocarbon stream in the second reactor at a rate sufficient to achieve the desired 0.2 to 2 percentage by weight of the final tetrapolymer product produced by the second reactor.

A second non-conjugated diene can be introduced to the saturated hydrocarbon stream at a rate sufficient to achieve the desired 0.2 to 15 percentage by weight of the final tetrapolymer produced by the second non-conjugated diene content in the high molecular weight tetrapolymer product with a narrow molecular weight distribution from the second reactor.

An ethylene monomer can be introduced to the saturated hydrocarbon stream at a rate sufficient to initiate a polymerization reaction and achieve a desired ethylene content of 60 percent to 80 percent of total weight in the final tetrapolymer produced in the second reactor.

In embodiments, the combined saturated hydrocarbon stream, propylene monomer, the first non-conjugated diene, the second non-conjugated diene, and the ethylene monomer in the second reactor can be cooled to a temperature below 35 degrees Celsius to create a cooled mixture.

A Ziegler-Natta catalyst and co-catalyst, and optionally an additional promoter, can be concurrently and continuously introduced into the cooled mixture in the second reactor.

As in the first reactor, the Ziegler-Natta catalyst can include a transition metal compound. The Ziegler-Natta catalyst can be introduced at a feed rate sufficient to sustain a continuous reaction.

As in the first reactor, the co-catalyst can be a metal alkyl comprising a halogen element and the promoter, if used, can be an oxidizing agent capable of oxidizing the transition metal and generating at least one halogen free-radical per mole of the promoter.

In embodiments, the combined ingredients of the cooled mixture, Ziegler-Natta catalyst and co-catalyst, the promoter, if used, can be combined in solution phase for 15 minutes to 60 minutes at a temperature from 35 degrees Celsius to 65 degrees Celsius and at a pressure from 190 psig to 230 psig which is lower than the pressure used in the first reactor; forming a resulting high molecular weight tetrapolymer.

The final tetrapolymer product can have the following characteristics: polymer chain branching as characterized by a tangent delta ranging from 0.15 to 0.75, a non-linear relationship between viscosity and shear as characterized by the tangent delta from 0.15 to 0.75, a weight average molecular weight of 500,000 to 1,500,000 Daltons, a dynamic complex viscosity of 600,000 to 1,400,000 Pa·sec, an ethylene to propylene ratio ranging from 55:45 to 90:10 by weight forming an ethylene rich high molecular weight tetrapolymer product with a molecular weight distribution ranging from 2.3 to 10.0 a first non-conjugated diene content of 0.2 to 2 percent by weight content based upon the total weight final tetrapolymer, and a second non-conjugated diene content of 0.2 to 15 percent by weight content based upon the total weight of the final tetrapolymer product.

In embodiments, the process can include adding from 0.1 weight percent to 0.5 weight percent of an antioxidant to the final tetrapolymer product produced in the second reactor.

In embodiments, the saturated hydrocarbon stream or the saturated hydrocarbon stream can be a hexane or an isoparafinic fluid.

In embodiments, the first non-conjugated diene and the second non-conjugated diene can have ethylidene norbornene, vinylnorbornene, and/or octadiene or combinations thereof.

In embodiments, the first non-conjugated diene can be a vinyl norbornene or 1,7-octadiene or dicylopentadiene.

In embodiments, the Ziegler-Natta catalyst can be a titanium tetrachloride, vanadium oxytrichloride or a vanadium trialkoxide.

In embodiments, the co-catalyst can be a diethylaluminum chloride, ethylaluminum sesquichloride, or ethylaluminum dichloride.

In embodiments, the oxidizing agent can be an ester with a halogen element.

In embodiments, the oxidizing agent can be a dichlorophenylacetic acid ethyl ester, or butyl 4,4,4-trichloro-2-methyl-but-2-enoate.

In embodiments, the process can include premixing the Ziegler-Natta catalyst co-catalyst and the promoter, if used, before introduction to the first reactor or the second reactor.

In embodiments, the molar ratio of the co-catalyst to the sum of the Ziegler-Natta catalyst and the promoter if used can be from 1 to 50.

In embodiments, an extender oil can be added to at least one reactor. The extender oil can be a hydrotreated paraffinic oil.

The embodiments can apply to an anti-vibration article made from the tetrapolymer of claim 1.

In embodiments, the anti-vibration article can be a vehicle muffler hanger or exhaust pipe hangers, an engine mount, a thermoplastic vulcanizate (TPV), a belt, a gasket, and a hose.

EXAMPLES

A saturated hydrocarbon solvent can be utilized as a reaction medium and carrier stream for all monomers used in the process. The saturated hydrocarbon can be introduced to the first reactor at a flow rate adequate to sustain a residence time of 30 minutes to 60 minutes in the first reactor. Prior to entering the first reactor, the saturated hydrocarbon stream can be passed through a chiller to reduce its temperature below 35 degrees Celsius.

In the examples shown below, hexane or isoparaffinic fluid can be used. Hexane as the hydrocarbon solvent is preferred due to its ready availability and ease of removal from the final product. However, many other hydrocarbon solvents can be utilized, such as, heptane, octane, and combinations thereof.

A pure propylene monomer can be introduced to the saturated hydrocarbon solvent at a flow rate to achieve the desired propylene weight content in a final tetrapolymer product. The propylene content in the final tetrapolymer product can range from 20 percent to 28 percent by weight. The propylene to ethylene ratio in the final tetrapolymer product can range from 20:80 to 35:65 in the final product of the tetrapolymer.

Hydrogen gas can be introduced to the first saturated hydrocarbon stream at a rate sufficient to control the weight average molecular weight of tetrapolymer product from the first reactor to be from 1,500,000 to 2,500,000 Daltons. For example, the hydrogen can be introduced at a rate from 0.01 to 20 standard liters per hour for small reactions which can generate 1.0 kilogram of high molecular weight tetrapolymer product. In embodiments, the hydrogen can be introduced in dilute solutions of 10 percent hydrogen in nitrogen.

For large chemical processing conditions the hydrogen can be introduced to the first reactor at a rate from 0.01 cubic feet per hour to 10 cubic feet per hour.

A first non-conjugated diene can be introduced to the first saturated hydrocarbon stream at a rate sufficient to achieve a desired first non-conjugated diene content in the final tetrapolymer product.

For example, vinyl norbornene or 1,7-octadiene can be used. Thedienes can be introduced using a carrier of a solvent, such as a hexane solution.

In small reactors, the first non-conjugated diene can be introduced at rates from 0.01 grams to 5 grams per hour to the first reactor as neat. Larger amounts can be used for larger reactors to achieve the desired diene content in the high molecular weight tetrapolymer product using larger quantities of starting materials.

In larger reactors, the first non-conjugated diene can be introduced at rates from 0.1 pounds per hour to 20 pounds per hour as neat.

In sequence, a second non-conjugated diene can be introduced to the first reactor after introducing the first saturated hydrocarbon stream.

The second non-conjugated diene can be introduced at a rate sufficient to achieve a desired second non-conjugated diene content in the high molecular weight tetrapolymer product, produced with a molecular weight distribution of 1.0 to 2.2.

In small reactors, the second non-conjugated diene can be introduced at rates from 5 grams to 60 grams per hour to the first reactor as neat. Larger amounts can be used to achieve the desired second diene content in the high molecular weight tetrapolymer product produced in the first reactor with larger quantities of starting materials in larger reactors.

In larger reactors, the second non-conjugated diene can be introduced at rates from 50 to 250 pounds per hour as neat.

Examples of other norbornene derivatives can be used as the second diene. Similar results are to be expected with other dienes with similar chemical characteristics.

The dienes can be numerous molecules as known to persons ordinarily skilled in the art. In the current example, both 5-ethylidene-2-norbornene (ENB) and 5-Vinyl-2-norbornene (VNB) can be used as dienes for preparing a final tetrapolymer product.

Some examples of other norbornene derivatives can be: 5-methylene-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene, 5-(7-octenyl)-2-norbornene.

The mixture of the saturated hydrocarbon solvent, propylene, hydrogen, and dienes can be sent through a chiller to reduce its temperature below 35 degrees Celsius to create a cooled mixture. The cooling can be a continuous flow reaction, such as at 100 grams per minute total flow for small reactors.

As the polymerization reaction to follow can be exothermic, this cooling step helps to maintain the desired temperature range within the reactor. Although the process as described is for solution polymerization, with some minor adjustments to the catalyst, it can be adapted to gas, or slurry phase processes.

A Ziegler-Natta catalyst, optionally a first catalyst promoter, and co-catalyst, can be introduced to the first reactor. Optionally, the first catalyst promoter can be introduced into the first reactor.

The Ziegler-Natta catalyst can have a transition metal, or a transition metal compound. Some examples of transition metals (or compounds thereof) can be vanadium, titanium, and zirconium. However, other transition metals and their compounds can be substituted by persons ordinarily skilled in the art such as titanium tetrachloride, vanadium oxytrichloride or a vanadium trialkoxide.

The Ziegler-Natta catalyst can be introduced at a flow rate sufficient to sustain a continuous reaction. The example below serves to illustrate this.

Feed rates for a small reactor can range from 0.01 grams per hour to 0.05 grams per hour. Feed rates for a larger reactor can range from 0.2 pounds per hour to 0.5 pounds per hour.

The co-catalyst can have a metal alkyl which can have a halogen element. The co-catalysts utilized can be diethylaluminum chloride, ethylaluminum sesquichloride, or ethylaluminum dichloride.

However, many other compounds can be substituted by persons ordinarily skilled in the art.

The co-catalyst can be introduced at a flow rate sufficient to sustain a continuous reaction as illustrated below.

If used, the promoter can be an oxidizing agent capable of oxidizing the transition metal and generating at least one halogen free radical per mole of promoter used. An example of a promoter can be dichlorophenylacetic acid ethyl ester.

Other examples of a promotor can be a chlorinated ester, such as butyl 4,4,4-trichloro-2-methyl-but-2-enoate. However, many other organic compounds that generate halogen free radicals can be substituted by persons ordinarily skilled in the art.

The promoter can be introduced either separately, or in solution with the Ziegler-Natta catalyst at a flow rate sufficient to sustain a continuous reaction. The example below serves to illustrate this.

The flow rate of all the above components can be adjusted to allow for a residence time for the reaction of from 15 minutes to 60 minutes in the reactor at a temperature from 35 degrees Celsius to 65 degrees Celsius, and at a pressure of 190 pounds per square inch gauge (psig) to 230 pounds per square inch gauge (psig).

A high molecular weight tetrapolymer product can be produced in the first reactor with the following characteristics.

The physical properties of the formed high molecular weight tetrapolymer from the first reactor can include: polymer chain branching as characterized by a tangent delta ranging from 0.15 to 0.75 at 150 degrees Celsius, 0.84 rad/sec, a non-linear relationship between viscosity and shear as characterized by the tangent delta from 0.15 to 0.75, a dynamic complex viscosity of 1,500,000 to 3,500,000 Pa·sec at 150 degrees Celsius, a weight average molecular weight from 1,500,000 to 2,500,000 Daltons, a molecular weight distribution ranging from 1.0 to 2.2 needed for producing a higher mechanical strength in the final polymer, and an ethylene to propylene ratio ranging from 50:50 to 90:10 by weight forming an ethylene rich polymer.

It should be noted that the first non-conjugated diene content can be from 0.2 to 2 percent by weight content based upon the total weight of the resultant tetrapolymer, and a second non-conjugated diene content is from 0.2 to 15 percent by weight content based upon the total weight of the resultant tetrapolymer.

A second reactor can be configured to receive the high molecular weight tetrapolymer product from the first reactor.

A second saturated hydrocarbon stream having the same components as the first saturated hydrocarbon stream can be introduced to the second reactor.

Propylene monomer can be introduced to the second saturated hydrocarbon stream at a rate sufficient to achieve total propylene content of 29 to 45 percent of total weight in the final tetrapolymer product from the second reactor.

In embodiments, hydrogen gas can be introduced to the second saturated hydrocarbon stream at a rate sufficient to control the molecular weight of the final tetrapolymer product.

The hydrogen gas can be introduced to the second saturated hydrocarbon stream at a rate sufficient to control the molecular weight of the final tetrapolymer product from the second reactor to be from 500,000 Daltons to 1,500,000 Daltons.

For example, the hydrogen can be introduced at a rate from 0.01 to 20 standard liters per hour for small reactions, which can generate 1.0 kilogram of final tetrapolymer. In embodiments the hydrogen can be introduced in dilute solutions of 10 percent hydrogen in nitrogen.

For large chemical processing conditions the hydrogen can be introduced to the first reactor at a rate from 0.01 cubic feet per hour to 10 cubic feet per hour.

A first non-conjugated diene can be introduced to the second saturated hydrocarbon stream at a rate sufficient to achieve a desired first non-conjugated diene content in the final tetrapolymer product.

In small reactors, the first non-conjugated diene can be introduced at rates from 0.01 grams to 5 grams per hour to the second reactor as neat. Larger amounts can be used for larger reactors to achieve the desired diene content in the final tetrapolymer product with larger quantities of starting materials.

In larger reactors, the first non-conjugated diene can be introduced to the second reactor at rates from 0.1 to 24 pounds per hour as neat.

In embodiments, a second non-conjugated diene can be introduced in sequence to the second reactor after introducing the saturated hydrocarbon stream.

The second non-conjugated diene can be introduced at a rate sufficient to achieve a desired second non-conjugated diene content in the final tetrapolymer product.

In small reactors, the second non-conjugated diene can be introduced at rates from 5 grams to 60 grams per hour to the second reactor as neat. Larger amounts can be used to achieve the desired second diene content in the final tetrapolymer product with larger quantities of starting materials in larger reactors.

In larger reactors, the second non-conjugated diene can be introduced at rates from 50 to 250 pounds per hour as neat.

A second ethylene monomer can be introduced into the second reactor in the second saturated hydrocarbon stream at a rate sufficient to initiate the polymerization reaction and achieve desired ethylene content in the final tetrapolymer product of 55 to 90 percent of total weight.

The second saturated hydrocarbon stream, the propylene monomer, the hydrogen gas, the first non-conjugated diene, and second non-conjugated diene and the ethylene monomer can be cooled to below 35 degrees Celsius to create a second cooled mixture.

In embodiments, an additional Ziegler-Natta catalyst, an additional co-catalyst, and optionally a promoter, can concurrently be introduced into the second reactor.

In embodiments, the initial Ziegler-Natta catalyst and the additional Ziegler-Natta catalyst can be identical, but in other embodiments, they can be different.

The additional Ziegler-Natta catalyst can be introduced at a feed rate sufficient to sustain a continuous reaction.

In embodiments, the additional co-catalyst can be a metal alkyl with a halogen element. If used, the additional promoter can have an oxidizing agent capable of oxidizing the transition metal. The oxidizing agent can be configured to produce at least one halogen free-radical per mole of the additional promoter.

The second cooled mixture can be reacted with an additional Ziegler-Natta catalyst, the additional co-catalyst, and the additional promoter if used, in solution phase for 15 minutes to 60 minutes at a temperature from 35 degrees Celsius to 65 degrees Celsius and a pressure from 190 psig to 230 psig which is lower than the first reactor, forming a low damping high strength final tetrapolymer product with high density impact absorbency and heat resistance.

The final tetrapolymer product has polymer chain branching as characterized by a tangent delta ranging from 0.15 to 0.75, a non-linear relationship between viscosity and shear as characterized by the tangent delta from 0.15 to 0.75, a dynamic complex viscosity for 600,000 to 1,400,000 Pa·sec, a weight average molecular weight of 500,000 to 1,500,000 Daltons, a molecular weight distribution ranging from 2.3 to 10.0 an ethylene to propylene ratio ranging from 55:45 to 90:10 by weight forming the final tetrapolymer which is an ethylene rich polymer, with a first non-conjugated diene content of 0.2 to 2 percent by weight content based upon the total weight of the final tetrapolymer product, and with a second non-conjugated diene content of 0.2 to 15 percent by weight content based upon the total weight of the final tetrapolymer product.

This process allows for broad molecular weight distribution (MWD) products, using two reactors in sequence, which translates to higher green strengths, improved mill handling, extremely smooth extrusion surfaces due to the relationship between viscosity and shear rate, and optimum qualities for injection molding.

At the same time, this process allows for high diene content in the final tetrapolymer product, which translates to faster cure rates, and excellent compression set characteristics for sealing applications.

Example 1

In this example, the high molecular weight tetrapolymer having a molecular weight distribution of 1.0 to 2.2 is created in the first reactor and the final high molecular weight tetrapolymer with a molecular weight distribution of 2.3 to 10 can be created in the second reactor.

First Reactor

A saturated hydrocarbon stream can be introduced to a first reactor at 115 grams per minute.

A first propylene monomer can be introduced to the first saturated hydrocarbon stream at a rate of 12 grams per minute to achieve the first propylene content of 27.7 percent of total weight in a high molecular weight tetrapolymer product formed in the first reactor.

A hydrogen gas can be introduced to the first saturated hydrocarbon stream at 1.5 standard liters per hour to control the molecular weight of the high molecular weight tetrapolymer product formed in the first reactor.

A first non-conjugated diene of vinyl norbornene can be introduced to the first saturated hydrocarbon stream at a rate of 0.015 grams per hour to achieve a desired first non-conjugated diene content of 0.2 to 2 percent in the high molecular weight tetrapolymer product formed in the first reactor.

A second non-conjugated diene of ethylidene norbornene can be introduced to the first saturated hydrocarbon stream at a rate of 25 grams per hour to achieve a desired second non-conjugated diene content of 0.2 to 15 percent in the high molecular weight tetrapolymer product from the first reactor.

A first monomer of ethylene can be introduced to the first saturated hydrocarbon stream at a rate of 5.5 grams per minute to initiate the polymerization reaction and achieve desired ethylene content of 68.5 percent of total weight of the high molecular weight tetrapolymer formed in the first reactor.

The first saturated hydrocarbon stream, the first propylene monomer, the hydrogen gas, the first non-conjugated diene, the second non-conjugated diene, and the ethylene can be cooled to below 35 degrees Celsius as the components enter the reactor to create a cooled mixture.

In embodiments, a Ziegler-Natta catalyst, a co-catalyst, and optionally a promoter can be simultaneously flowed into the first reactor.

The Ziegler-Natta catalyst can be vanadium oxytrichloride, introduced at a feed rate sufficient to sustain a continuous reaction. In this example catalyst can be introduced at a rate of 0.15 grams per hour neat.

The co-catalyst can be ethylaluminum sesquichloride, and the promoter can be dichlorophenylacetic acid ethyl ester; both being introduced a rate sufficient to sustain the polymerization reaction.

The cooled mixture, the Ziegler-Natta catalyst, the co-catalyst, the promoter, reacted for 25 minutes and at a temperature of 40 degrees Celsius and a pressure of 230 psig yields a high molecular weight tetrapolymer in the first reactor.

The high molecular weight tetrapolymer product has the following characteristics: polymer chain branching as characterized by a tangent delta of 0.49, a weight average molecular weight of 1,194,000 Daltons, a dynamic complex viscosity of 2,150,000 Pa·sec, an ethylene to propylene ratio 72:28 by weight, a molecular weight distribution of 2.2, a combined weight content of ethylene and propylene of 96.2 percent based upon the total weight of the resultant high molecular weight tetrapolymer, a first non-conjugated diene content of 0.19 percent by weight content based upon the total weight of the resultant high molecular weight tetrapolymer, and a second non-conjugated diene content of 3.61 percent by weight content based upon the total weight of the resultant high molecular weight tetrapolymer.

Reactor 2

In embodiments, a second reactor can continuously receive the high molecular weight tetrapolymer product from the first reactor. A second saturated hydrocarbon stream can be introduced into the second reactor at a rate to maintain the desired residence time.

A second propylene monomer can be introduced to the second saturated hydrocarbon stream at a rate of 7 grams per minute, which is sufficient to achieve total propylene content of 32 percent of total weight in the final tetrapolymer product.

A first non-conjugated diene of vinyl norbornene can be introduced to the second saturated hydrocarbon stream into the second reactor at a rate of 1.5 grams per hour that is sufficient to achieve the desired 0.2 to 2 percent first non-conjugated diene content in the final tetrapolymer product.

A second non-conjugated diene of ethylidene norbornene can be introduced to the second saturated hydrocarbon stream in the second reactor at a rate of 36 grams per hour that is sufficient to achieve the desired second non-conjugated diene content of 0.2 to 15 percent in the final tetrapolymer product.

A second ethylene monomer can be introduced to the second saturated hydrocarbon stream at a rate of 3.5 grams per minute that is sufficient to initiate the polymerization reaction and achieve desired ethylene content in the final tetrapolymer product.

The second saturated hydrocarbon stream, the propylene monomer, the first non-conjugated diene, the second non-conjugated diene, and the ethylene monomer can be cooled to below 35 degrees Celsius to create a second cooled mixture.

In embodiments, and all at once, additional Ziegler-Natta catalyst that is the same as the initial Ziegler-Natta catalyst, an additional identical co-catalyst, and additional identical promoter, are added into the second reactor at a feed rate of 0.03 grams per hour for the Ziegler-Natta catalyst neat, a feed rate of 0.272 grams per hour for the co-catalyst neat, and a feed rate of 0.127 grams per hour for the promoter, all sufficient to sustain a continuous reaction.

The cooled mixture can react with additional Ziegler-Natta catalyst, the additional co-catalyst, the additional promoter in solution phase for 30 minutes at a temperature of 36 degrees Celsius and a pressure from 190 to 230 psig, which is lower than the first reactor.

The final tetrapolymer product can have a polymer chain branching as characterized by a tangent delta of 0.55, a non-linear relationship between viscosity and shear as characterized by the tangent delta of 0.55; a weight average molecular weight of 1,164,000 Daltons; a dynamic complex viscosity of 1,620,000 Pa·sec; an ethylene to propylene ratio of 66:34 by weight; a molecular weight distribution of 3.0, a first non-conjugated diene, vinyl norbornene, content of 0.3 percent by weight content based upon the total weight of the final tetrapolymer product, and a second non-conjugated diene, ethylidene norbornene, content of 5.3 percent by weight content based upon the total weight of the final tetrapolymer product.

Example 2

In embodiments, the order of production of the tetrapolymers can be reversed to create the resultant tetrapolymer product.

The reagents normally fed to reactor 2 can be fed to reactor 1 with minor adjustments to produce the first tetrapolymer. The first tetrapolymer can then be flowed into reactor 2 along with additional reagents to produce a final tetrapolymer having the same high weight average molecular weight range and molecular weight distribution range of the final product discussed in Example 1.

In embodiments, this process can create a final tetrapolymer having high molecular weight (Mw), a molecular weight distribution (MWD) of 2.3 to 10.0, high degree of branching, and high diene content.

The first reactor can be charged with hexane at a flow rate of 100 grams per minute.

In embodiments, pure propylene monomer can be introduced to the hexane stream at a flow rate of 11 grams per minute.

A hydrogen in nitrogen mix with 10 percent hydrogen by weight is introduced to the hexane stream at a flow rate of 6.0 standard liters per hour.

In embodiments, an ethylidene norbornene (ENB) monomer solution (in hexane) can be introduced to the hexane stream with at a flow rate of 92 grams of solution per hour (55 grams per hour neat).

In embodiments, a 5-vinyl-2-norbornene monomer solution (in hexane) can be introduced to the hexane stream at a flow rate of 30 grams per hour (3.2 grams per hour neat).

In embodiments, a polymer grade ethylene monomer can be incrementally introduced to the hexane stream to reach a maximum flow rate of 4.5 grams per minute.

The first saturated hydrocarbon stream, the first propylene monomer, the hydrogen gas, the first non-conjugated diene, the second non-conjugated diene, and the ethylene can be cooled to below 35 degrees Celsius as the components enter the reactor to create a cooled mixture.

A chlorinated aluminum alkyl co-catalyst solution (ethyl aluminum sesquichloride in hexane) can be fed directly to the first reactor by separate stream at a rate of 66 grams of solution per hour (3.0 grams per hour neat).

In embodiments, a Ziegler-Natta catalyst solution (vanadium oxytrichloride in hexane) and a promoter solution (in hexane) can be each introduced to the first reactor by separate streams at flow rates of 66 grams per hour (0.0996 and 0.474 grams per hour neat, respectively).

The Ziegler-Natta catalyst and promoter can be premixed in hexane to yield a solution that is fed directly to the reactor as a single stream.

When all reagents have been added to the reactor, the polymerization reaction can be allowed to proceed with a residence time of approximately 30 minutes at a temperature of 43 degrees Celsius, and a reactor pressure of 230 psig, resulting in a tetrapolymer product.

Reactor 2

In embodiments, a second reactor can continuously receive the tetrapolymer product from the first reactor. A second saturated hydrocarbon stream can be introduced into the second reactor at a rate to maintain the desired residence time.

A second propylene monomer can be introduced to the second saturated hydrocarbon stream at a rate of 3 grams per minute, which is sufficient to achieve total propylene content of 32 percent of total weight in the final tetrapolymer product.

A first non-conjugated diene can be introduced to the second saturated hydrocarbon stream into the second reactor at a rate of 3.0 grams per hour (0.8 grams per hour neat) that is sufficient to achieve a desired first non-conjugated diene content in the final tetrapolymer product.

A second non-conjugated diene can be introduced to the second saturated hydrocarbon stream in the second reactor at a rate of 80 grams per hour (2.4 grams per hour neat) that is sufficient to achieve a desired second non-conjugated diene content in the final tetrapolymer product.

A second ethylene monomer can be introduced to the second saturated hydrocarbon stream at a rate of 4.0 grams per minute that is sufficient to initiate the polymerization reaction and achieve desired ethylene content in the final tetrapolymer product of 62 percent of total weight.

The second saturated hydrocarbon stream, the propylene monomer, the first non-conjugated diene, the second non-conjugated diene, and the ethylene monomer can be cooled to below 35 degrees Celsius to create a second cooled mixture.

In embodiments, and all at once, additional Ziegler-Natta catalyst that is the same as the initial Ziegler-Natta catalyst, an additional identical co-catalyst, and additional identical promoter, are added into the second reactor at a feed rate of 0.001 grams per hour for the Ziegler-Natta catalyst neat, a feed rate of 2.0 grams per hour for the co-catalyst neat, and a feed rate of 0.005 grams per hour for the promoter neat, all sufficient to sustain a continuous reaction.

The cooled mixture can react with additional Ziegler-Natta catalyst, the additional co-catalyst, the additional promoter in solution phase for 30 minutes at a temperature of 36 degrees Celsius and a pressure from 190 to 230 psig which is lower than the first reactor to form the final tetrapolymer product.

The tetrapolymer formed has a weight average molecular weight of 520,000 Daltons, a molecular weight distribution (MWD) of 3.18, and a tangent delta value of 0.60, indicative of a high level of branching.

In embodiments, the tetrapolymer has an ethylene:propylene ratio of 69:31, a VNB weight percent of 0.19 weight percent, and ENB content of 9.0 weight percent.

Below are additional examples of final tetrapolymers and their physical properties according to this unique process.

Example 3

The final tetrapolymer can have a propylene monomer of 29 percent, an ethylidene norbornene of 2.55 percent, a vinyl norbornene of 0.26 percent, a weight average molecular weight (Mw) of 520,403 Daltons, a Mw/Mn of 2.99, and a tangent delta of 0.64.

Example 4

The final tetrapolymer can have a propylene monomer of 30 percent, an ethylidene norbornene of 4.03 percent, a vinyl norbornene of 0.27 percent, a weight average molecular weight (Mw) of 636,291 Daltons, a Mw/Mn of 2.36, and a tangent delta of 0.64, an extender oil with weight percent of based on final tetrapolymer product of 36 percent, and a NAUGARD™ 76 or IRGANOX™ 1076 with weight percent of based on final tetrapolymer product of 0.1 weight percent.

In embodiments, the first oxidizing agent or the oxidizing agent can be an ester comprising a halogen element.

In embodiments, the final tetrapolymer product can have an extender oil.

In embodiments, the extender oil can be a hydrotreated paraffinic oil.

Below are examples of formed tetrapolymers and their physical properties according to the process outlined in Example 5.

Example 5

The first reactor tetrapolymer has a propylene monomer of 31 percent, an ethylidene norbornene of 4.8 percent, a vinyl norbornene of 0.19 percent, a weight average molecular weight (Mw) of 481,782 Daltons, and a Mw/Mn of 2.20.

The second reactor has a propylene monomer of 33 percent, an ethylidene norbornene of 7.6 percent, a vinyl norbornene of 0.24 percent, a weight average molecular weight (Mw) of 961,053 Daltons, and a Mw/Mn of 2.73.

Example 6

Using the methodology described above, the first reactor produces a tetrapolymer having a ratio of 20 to 80 propylene to ethylene by weight, and the second reactor produces a tetrapolymer having a 29 to 71 propylene to ethylene weight ratio to yield a tetrapolymer with the following characteristics: polymer chain branching as characterized by a tangent delta of 0.75; a non-linear relationship between viscosity and shear as characterized by the tangent delta of 0.75; a weight average molecular weight of 500,000 Daltons; a dynamic complex viscosity of 600,000 Pa·sec; an ethylene to propylene ratio ranging from 75:25 by weight, a molecular weight distribution of 2.5, a first non-conjugated diene, VNB, content of 0.2 percent by weight content based upon the total weight; and a second non-conjugated diene content, ENB, of 15 percent by weight content based upon the total weight of the high molecular weight tetrapolymer.

Example 7

Using the methodology described above, the first reactor produces a tetrapolymer having a propylene to ethylene weight ratio of 35 to 65 and the second reactor produces a tetrapolymer having a propylene to ethylene weight ratio of 45 to 55 to yield a final tetrapolymer with the following characteristics: polymer chain branching as characterized by a tangent delta of 0.75; a non-linear relationship between viscosity and shear as characterized by the tangent delta of 0.75; a weight average molecular weight of 1,500,000 Daltons, a molecular weight distribution of 3.0, a dynamic complex viscosity of 1,400,000 Pa·sec; an ethylene to propylene ratio of 60:40 by weight; a first non-conjugated diene content (VNB) of 0.2 percent by weight content based upon the total weight, and a second non-conjugated diene (ENB) content of 7.5 percent by weight content based upon the total weight of the high molecular weight tetrapolymer product.

While the examples have been described with emphasis on the embodiments, it should be understood within the scope of the appended claims, the embodiments might be practiced other than as specifically described herein.

What is claimed is:

1. A process for continuously making a high molecular weight tetrapolymer, the process comprising:
   a. in a first reactor:
      (i) introducing a saturated hydrocarbon stream;
      (ii) introducing a propylene monomer to the saturated hydrocarbon stream at a rate to achieve a propylene content of 20 percent to 35 percent of total weight in a high molecular weight tetrapolymer product;
      (iii) introducing hydrogen gas to the saturated hydrocarbon stream at a rate to control a molecular weight of the high molecular weight tetrapolymer product;
      (iv) introducing a first non-conjugated diene to the saturated hydrocarbon stream at a rate to achieve a first non-conjugated diene content of 0.2 percent to 2.0 percent by weight in the high molecular weight tetrapolymer product;
      (v) introducing a second non-conjugated diene to the saturated hydrocarbon stream at a rate to achieve a second non-conjugated diene of 0.2 percent to 15.0 percent by weight content in the high molecular weight tetrapolymer product, wherein the first non-conjugated diene is different from the second non-conjugated diene;
      (vi) introducing an ethylene monomer to the saturated hydrocarbon stream at a rate to initiate the polymerization reaction and achieve ethylene content of 50 percent to 80 percent of the total weight in the high molecular weight tetrapolymer product;
      (vii) cooling the combined saturated hydrocarbon stream, the propylene monomer, the hydrogen gas, the first non-conjugated diene, the second non-conjugated diene, and the ethylene monomer to below 35 degrees Celsius to create a cooled mixture;
      (viii) introducing a Ziegler-Natta catalyst and a co-catalyst, and optionally a promoter into the cooled mixture, wherein:
         1. the Ziegler-Natta catalyst comprises a transition metal compound, and the Ziegler Natta catalyst is introduced at a feed rate to sustain a continuous reaction;
         2. the co-catalyst comprises a metal alkyl comprising a halogen element; and
         3. the promoter, optionally, comprises an oxidizing agent capable of oxidizing the transition metal, and generating at least one halogen free-radical per mole of the promoter;
      (ix) reacting the cooled mixture, the Ziegler-Natta catalyst, the co-catalyst, the promoter, optionally, the first non-conjugated diene, and the second non-conjugated diene for 15 minutes to 60 minutes at a temperature from 35 degrees Celsius to 65 degrees Celsius and at pressure from 190 psig to 230 psig; and forming the high molecular weight tetrapolymer product having the following characteristics:
         1. polymer chain branching having a tangent delta ranging from 0.15 to 0.75;
         2. a non-linear relationship between viscosity and shear having the tangent delta from 0.15 to 0.75;
         3. a weight average molecular weight from 1,500,000 Daltons to 2,500,000 Daltons;
         4. a dynamic complex viscosity from 1,500,000 Pa·sec to 3,500,000 Pa·sec;
         5. an ethylene to propylene ratio ranging from 50:50 to 90:10 by weight forming an ethylene rich high molecular weight tetrapolymer product;
         6. a molecular weight distribution ranging from 1.0 to 2.2;
         7. a first non-conjugated diene content of 0.2 percent to 2 percent by weight content based upon a total weight of the high molecular weight tetrapolymer product; and
         8. a second non-conjugated diene content of 0.2 percent to 15 percent by weight content based upon the total weight of the high molecular weight tetrapolymer product; and
   b. in a second reactor continuously receiving the high molecular weight tetrapolymer product from the first reactor:
      (i) introducing a saturated hydrocarbon stream to the second rector;
      (ii) introducing a propylene monomer to the saturated hydrocarbon stream in the second reactor at a rate to achieve a total propylene content of 29 percent to 45 percent of a total weight in the high molecular weight tetrapolymer product;
      (iii) introducing a first non-conjugated diene to the saturated hydrocarbon stream in the second reactor at a rate to achieve a first non-conjugated diene content in the high molecular weight tetrapolymer product;
      (iv) introducing a second non-conjugated diene to the saturated hydrocarbon stream at a rate to achieve a second non-conjugated diene content in the high molecular weight tetrapolymer product;
      (v) introducing an ethylene monomer to the saturated hydrocarbon stream at a rate to initiate a polymerization reaction and achieve a ethylene content from 60 percent to 80 percent of total weight in the high molecular weight tetrapolymer product;
      (vi) cooling the combined saturated hydrocarbon stream, propylene monomer, the first non-conjugated diene, the second non-conjugated diene, and the ethylene monomer in the second reactor to below 35 degrees Celsius to create a cooled mixture;
      (vii) continuously introducing an additional Ziegler-Natta catalyst and an additional co-catalyst, and optionally an additional promoter, into the cooled mixture in the second reactor, wherein:
         1. the additional Ziegler-Natta catalyst comprises a transition metal compound and is introduced at a feed rate to sustain a continuous reaction;
         2. the additional co-catalyst comprises a metal alkyl comprising a halogen element; and
         3. the additional promoter optionally, comprises an oxidizing agent capable of oxidizing the transition metal and generating at least one halogen free-radical per mole of the promoter;
      (viii) reacting the combined cooled mixture, the additional Ziegler-Natta catalyst and the additional co-catalyst, the additional promoter optionally, in solution phase for 15 minutes to 60 minutes at a temperature from 35 degrees Celsius to 65 degrees Celsius and at a pressure from 190 psig to 230 psig that is lower than the pressure used in the first reactor, forming the high molecular weight tetrapolymer product with the following characteristics:
         1. polymer chain branching having a tangent delta ranging from 0.15 to 0.75;

2. a non-linear relationship between viscosity and shear having the tangent delta from 0.15 to 0.75;
3. a weight average molecular weight from 500,000 Daltons to 1,500,000 Daltons;
4. a dynamic complex viscosity from 600,000 Pa·sec to 1,400,000 Pa·sec;
5. an ethylene to propylene ratio ranging from 55:45 to 90:10 by weight forming an ethylene rich high molecular weight tetrapolymer product;
6. a molecular weight distribution ranging from 2.3 to 10.0;
7. a first non-conjugated diene content of 0.2 percent to 2 percent by weight content based upon the total weight of the high molecular weight tetrapolymer product; and
8. a second non-conjugated diene content of 0.2 percent to 15 percent by weight content based upon the total weight of the high molecular weight tetrapolymer product.

2. The process of claim 1, further comprising adding from 0.1 weight percent to 0.5 weight percent of an antioxidant and adding from 0.1 weight percent to 0.5 weight percent of an antioxidant to the final high molecular weight tetrapolymer product.

3. The process of claim 1, wherein the saturated hydrocarbon stream in the first reactor or the saturated hydrocarbon stream in the second reactor is a hexane or an isoparafinic fluid.

4. The process of claim 1, wherein the first non-conjugated diene and the second non-conjugated diene are both norbornene derivatives, 1,7-octadiene, or combinations thereof.

5. The process of claim 1, wherein the first non-conjugated diene is at least one of: a vinyl norbornene 1,7 octadiene and a dicylopentadiene.

6. The process of claim 1, wherein the second non-conjugated diene is at least one of: an ethylidene norbornene, 1,7-octadiene and a dicyclopentadiene.

7. The process of claim 1, wherein the Ziegler-Natta catalyst comprises at least one of: a titanium tetrachloride, a vanadium oxytrichloride and a vanadium trialkoxide.

8. The process of claim 1, wherein the co-catalyst is at least one of: a diethylaluminum chloride, an ethylaluminum sesquichloride, and an ethylaluminum dichloride.

9. The process of claim 1, wherein the oxidizing agent is an ester comprising a halogen element.

10. The process of claim 1, wherein the oxidizing agent is a dichlorophenylacetic acid ethyl ester, or a butyl 4,4,4-trichloro-2-methyl-but-2-enoate.

11. The process of claim 1, comprising premixing the Ziegler-Natta catalyst, the co-catalyst and the promoter, optionally, before introduction to the first reactor or the second reactor.

12. The process of claim 1 wherein a molar ratio of the co-catalyst to a sum of the Ziegler-Natta catalyst and the promoter optionally is from 1 to 50.

13. The process of claim 1, comprising adding an extender oil to the first reactor, the second reactor, or the first reactor and the second reactor.

14. The process of claim 13, wherein the extender oil is a hydrotreated paraffinic oil.

15. The process of claim 1, wherein the high molecular weight tetrapolymer product is used for manufacturing an anti-vibration article.

16. The process of claim 15, wherein the anti-vibration article is at least one of: a vehicle muffler hanger or exhaust pipe hangers, an engine mount, a thermoplastic vulcanizate (TPV), a belt, a gasket, and a hose.

* * * * *